Patented Sept. 11, 1951

2,567,350

UNITED STATES PATENT OFFICE 2,567,350

OMEGA-HALOALKYL BENZHYDRYL ETHER AND METHODS OF MAKING SAME

George Rieveschl, Jr., Grosse Pointe Woods, Mich., assignor to Parke, Davis & Company, Detroit, Mich., a corporation of Michigan No Drawing. Application August 5, 1946, Serial No. 688,420

10 Claims. (Cl. 260—611)

The invention relates to halogen ethers and to a novel method for obtaining the same. More particularly, the invention relates to ω-haloalkyl benzhydryl ethers having the formula,

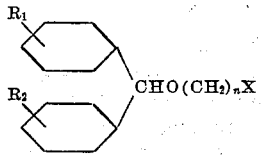

where $R_1$ and $R_2$ are the same or different substituents and represent hydrogen, a lower alkyl radical or a lower alkoxy radical, $n$ is one of the integers two and three and X is a chlorine or bromine atom.

This application is a continuation-in-part of my copending application Serial No. 531,639, filed April 18, 1944, now Patent No. 2,421,714, issued June 3, 1947.

The customary method of producing ω-haloalkyl ethers consists in reacting a metal alcoholate with a halohydrin to obtain an ω-hydroxyalkyl ether which is then treated with a halogenating agent such as thionyl chloride or a phosphorus halide to convert the hydroxyl group to a halogen atom. This two-step method of producing ω-haloalkyl ethers is not only tedious but unsatisfactory from the standpoint of yields.

It is well-known that when halohydrins such as ethylene chlorohydrin are treated with cold aqueous alkali that they are rapidly hydrolyzed to the corresponding glycol. Under anhydrous conditions halohydrins react readily with alkaline reagents to produce the corresponding alkylene oxide. In spite of the great reactivity of the halogen atom of the halohydrins in the presence of alkaline reagents, I have discovered that ω-halohydrins may be heated with a mixture of an alkali metal carbonate and a benzhydryl halide of the formula,

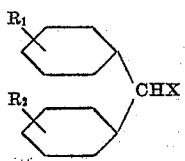

where $R_1$, $R_2$ and X have the same significance as given above, to produce high yields of the corresponding ω-haloalkyl benzhydryl ethers. This one-step process is preferably carried out in the absence of a solvent and at a temperature of between about 100 and 160° C. However, if desired, an anhydrous, inert organic solvent such as toluene or xylene may be used.

An excess of the alkali metal carbonate and halohydrin are usually used in carrying out the reaction to insure the complete utilization of the more expensive benzhydryl halide. However, it should be understood that it is not necessary to use an excess of the halohydrin and that the benzhydryl halide-halohydrin mol ratio may be reversed so long as sufficient alkali metal carbonate is used to react with the hydrogen halide formed during the reaction. The theoretical quantities of the three reactants can be calculated from the following equation which illustrates the transformations which take place during the process.

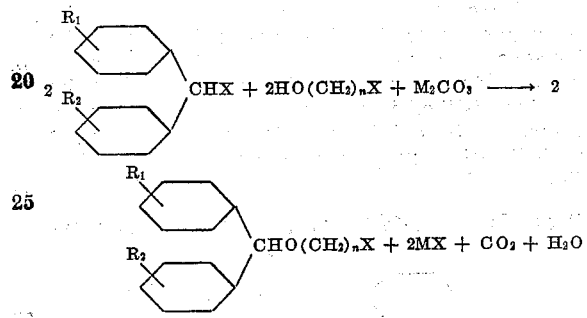

In the above equation $R_1$, $R_2$, $n$ and X have the same significance as previously given and M is an alkali metal.

The new components of the present invention are useful intermediates for the preparation of pharmaceuticals. For example, they may be reacted with secondary or tertiary amines such as dimethylamine, piperidine, trimethylamine and N-methylpiperidine to yield valuable products possessing antihistamine properties.

The invention is illustrated by the following examples.

*Example 1.—β-Bromoethyl benzhydryl ether*

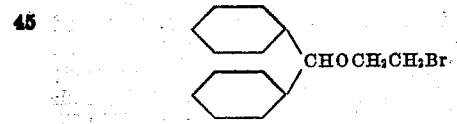

A mixture consisting of 494 g. of benzhydryl bromide, 206 g. of anhydrous sodium carbonate and 313 g. of ethylene bromohydrin is stirred and heated at 120–130° C. for eight hours. During the reaction carbon dioxide is evolved. After cooling, 500 cc. of benzene is added with stirring, the precipitate of inorganic salts filtered off and washed with benzene. The benzene is removed by distillation and the residual β-bromoethyl benzhydryl ether purified by distillation in vacuo; B. P. 169–72° C./2 mm.

*Example 2.—β-Chloroethyl benzhydryl ether*

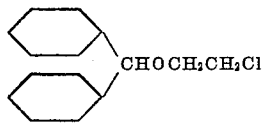

A mixture consisting of 474 g. of benzhydryl bromide, 120 g. of anhydrous potassium carbonate and 200 g. of ethylene chlorohydrin is heated at 130° C. with stirring for eight hours. At the end of this time the evolution of carbon dioxide has practically ceased. The residue is cooled, stirred with 700 cc. of ether and the insoluble inorganic salts removed by filtration. The ether is distilled from the filtrate and the residue distilled in vacuo to obtain the desired β-chloroethyl benzhydryl ether boiling at 170° C./10 mm. or 163° C./7 mm.; yield 80%.

*Example 3. — β-Bromoethyl p,p'-dimethylbenzhydryl ether*

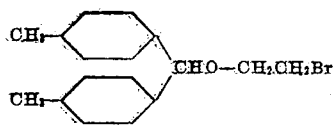

331 g. of p,p'-dimethylbenzhydryl chloride, 130 g. of anhydrous sodium carbonate and 250 g. of ethylene bromohydrin are heated with stirring at 135° C. for ten hours. The reaction mixture is cooled, treated with 500 cc. of benzene and the inorganic material which fails to dissolve in the benzene removed by filtration. The benzene is removed from the filtrate by distillation and the residue distilled in vacuo (c. a. at about 2 mm. pressure) to obtain the desired β-bromoethyl p,p'-dimethylbenzhydryl ether as a colorless liquid.

*Example 4. — γ-Chloropropyl o-methoxybenzhydryl ether*

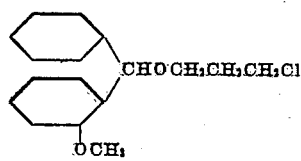

A mixture consisting of 267 g. of o-methoxybenzhydryl bromide, 120 g. of anhydrous potassium carbonate and 125 g. of trimethylene chlorohydrin in 200 cc. of xylene is heated with stirring at 135° C. for ten hours. The mixture is cooled, diluted with 200 cc. of xylene and the inorganic salts removed by filtration. The xylene is distilled from the filtrate and the residue distilled under reduced pressure to obtain the desired γ-chloropropyl o-methoxybenzhydryl ether.

Attention is called to other somewhat related copending applications as follows: Serial No. 640,685, filed January 11, 1946, now abandoned; Serial No. 640,686, filed January 11, 1946 which issued as Patent No. 2,508,422; Serial No. 640,687, filed January 11, 1946, now abandoned; Serial No. 660,406, filed April 8, 1946, which issued as Patent No. 2,483,434; Serial No. 688,421, filed August 5, 1946; Serial No. 688,422, filed August 5, 1946, now abandoned; Serial No. 688,423, filed August 5, 1946, now abandoned; Serial No. 688,- 424, filed August 5, 1946, which issued as Patent No. 2,453,729; Serial No. 688,425, filed August 5, 1946, which issued as Patent No. 2,483,435; Serial No. 688,426, filed August 5, 1946, which issued as Patent No. 2,437,711; Serial No. 688,427, filed August 5, 1946, which issued as Patent No. 2,483,436; Serial No. 739,985, filed April 8, 1947, which issued as Patent No. 2,437,878; Serial No. 751,983, filed June 2, 1947, which issued as Patent No. 2,454,092; Serial No. 751,984, filed June 2, 1947, which issued as Patent No. 2,483,671; Serial No. 751,985, filed June 2, 1947, which issued as Patent No. 2,455,949; Serial No. 780,099, filed October 15, 1947, which issued as Patent No. 2,527,962; Serial No. 15,257, filed March 16, 1948; and Serial No. 33,432, filed June 16, 1948, which issued as Patent No. 2,527,963.

What I claim as my invention is:

1. An ω-haloalkyl benzhydryl ether of the formula,

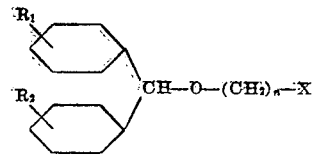

where $R_1$ and $R_2$ are members of the class consisting of hydrogen, lower alkyl and lower alkoxyl, $n$ is one of the integers two and three and X is a member of the class consisting of chlorine and bromine.

2. β-Bromoethyl benzhydryl ether.
3. β-Chloroethyl benzhydryl ether.
4. γ-Chloropropyl o-methoxybenzhydryl ether.
5. Process for obtaining an ω-haloalkyl benzhydryl ether of the formula,

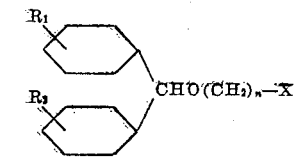

which comprises heating under anhydrous conditions an ω-halohydrin of the formula, $$HO(CH_2)_nX$$

with an alkali metal carbonate and a benzhydryl halide of the formula,

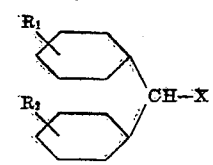

at a temperature between about 100 and 160° C., where $R_1$ and $R_2$ are members of the class consisting of hydrogen, lower alkyl and lower alkoxyl, $n$ is one of the integers two and three and X is a member of the class consisting of chlorine and bromine.

6. Process for obtaining an haloalkyl benzhydryl ether of the formula,

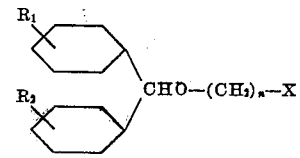

which comprises heating an ω-halohydrin of the formula, $$HO(CH_2)_n—X$$

with an alkali metal carbonate and a benzhydryl halide of the formula,

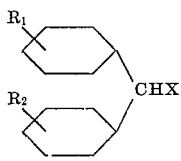

at a temperature between about 100 and 160° C. in the absence of a solvent, where $R_1$ and $R_2$ are members of the class consisting of hydrogen, lower alkyl and lower alkoxyl, n is one of the integers two and three and X is a member of the class consisting of chlorine and bromine.

7. Process for obtaining β-bromoethyl benzhydryl ether which comprises heating under anhydrous conditions in the absence of a solvent, ethylene bromohydrin with an alkali metal carbonate and a benzhydryl halide of the formula,

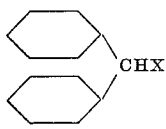

where X is a member of the class chlorine and bromine, at a temperature between about 100 to 160° C.

8. Process for obtaining β-chloroethyl benzhydryl ether which comprises heating under anhydrous conditions in the absence of a solvent, ethylene chlorohydrin with an alkali metal carbonate and a benzhydryl halide of the formula,

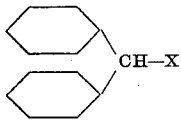

where X is a member of the class consisting of chlorine and bromine, at a temperature between about 100 and 160° C.

9. Process for obtaining γ-chloropropyl o-methoxy benzhydryl ether which comprises heating under anhydrous conditions in the absence of a solvent, trimethylene chlorohydrin with an alkali metal carbonate and a benzhydryl halide of the formula,

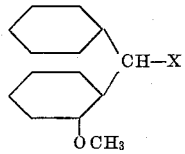

where X is a member of the class consisting of chlorine and bromine, at a temperature of between about 100 and 160° C.

10. A β-haloethyl benzhydryl ether of the formula,

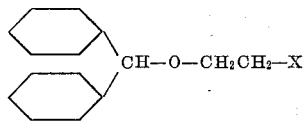

where X is a member of the class consisting of chlorine and bromine.

GEORGE RIEVESCHL, Jr.

REFERENCES CITED

The following references are of record in the file of this patent:

UNITED STATES PATENTS

| Number | Name | Date |
| --- | --- | --- |
| 2,130,525 | Coleman | Sept. 20, 1938 |
| 2,397,799 | Martin et al. | Apr. 2, 1946 |

OTHER REFERENCES

Friedel et al.: "Bulletin de la Societe Chimique de Paris," 2nd series (1880), pages 339, 340.